(12) United States Patent
Yokoyama et al.

(10) Patent No.: US 12,211,987 B2
(45) Date of Patent: Jan. 28, 2025

(54) WET MIXTURE, COATED LITHIUM-CONTAINING POSITIVE ELECTRODE ACTIVE MATERIAL PARTICLES, AND METHOD OF PRODUCING LITHIUM ION SECONDARY BATTERY, AND WET MIXTURE, COATED LITHIUM-CONTAINING POSITIVE ELECTRODE ACTIVE MATERIAL PARTICLES, AND LITHIUM ION SECONDARY BATTERY

(71) Applicant: TOYOTA JIDOSHA KABUSHIKI KAISHA, Toyota (JP)

(72) Inventors: Tomohiro Yokoyama, Toyota (JP); Ryuta Sugiura, Toyohashi (JP); Daisuke Horikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 17/819,339

(22) Filed: Aug. 12, 2022

(65) Prior Publication Data

US 2022/0393141 A1 Dec. 8, 2022

Related U.S. Application Data

(62) Division of application No. 16/886,877, filed on May 29, 2020, now Pat. No. 11,450,840.

(30) Foreign Application Priority Data

Jun. 5, 2019 (JP) .................................. 2019-104929

(51) Int. Cl.
*H01M 10/0525* (2010.01)
*H01M 4/02* (2006.01)
(Continued)

(52) U.S. Cl.
CPC ....... *H01M 4/0416* (2013.01); *H01M 4/1391* (2013.01); *H01M 4/366* (2013.01);
(Continued)

(58) Field of Classification Search
CPC ......... H01M 4/13–1399; H01M 4/366; H01M 4/505; H01M 4/525; H01M 4/62; H01M 2004/028
See application file for complete search history.

(56) References Cited

U.S. PATENT DOCUMENTS

2009/0105400 A1\* 4/2009 Komatsu ........... H01M 10/0568
526/245
2013/0260250 A1\* 10/2013 Yada ..................... H01M 4/485
429/231.95
(Continued)

FOREIGN PATENT DOCUMENTS

| CN | 103262316 A | 8/2013 |
| CN | 108539139 A | 9/2018 |

(Continued)

OTHER PUBLICATIONS

Tomohiro Yokoyama et al., U.S. Appl. No. 16/886,877, filed May 29, 2020.

*Primary Examiner* — Eugenia Wang
(74) *Attorney, Agent, or Firm* — Dickinson Wright, PLLC

(57) ABSTRACT

A method of producing a wet mixture includes a stirring and mixing process in which lithium-containing positive electrode active material particles having surplus lithium compounds on the surface and crystalline ferroelectric ceramic particles are dried, stirred and mixed to obtain a mixed powder; and a solution mixing process in which a lithium conductor forming solution is mixed with the mixed powder to obtain a wet mixture containing coated lithium-containing positive electrode active material particles having a coating which is made of an amorphous lithium conductor and in (Continued)

which the ferroelectric ceramic particles are dispersed on the surface of the lithium-containing positive electrode active material particles.

7 Claims, 6 Drawing Sheets

(51) Int. Cl.
  *H01M 4/04* (2006.01)
  *H01M 4/1391* (2010.01)
  *H01M 4/36* (2006.01)
  *H01M 4/505* (2010.01)
  *H01M 4/525* (2010.01)
  *H01M 4/62* (2006.01)

(52) U.S. Cl.
  CPC ........... *H01M 4/505* (2013.01); *H01M 4/525* (2013.01); *H01M 4/62* (2013.01); *H01M 10/0525* (2013.01); *H01M 2004/028* (2013.01)

(56) References Cited

U.S. PATENT DOCUMENTS

| | | |
|---|---|---|
| 2014/0227606 A1 | 8/2014 | Suzuki et al. |
| 2018/0248180 A1* | 8/2018 | Liu ........................ H01M 4/139 |
| 2018/0254477 A1 | 9/2018 | Horikawa et al. |

FOREIGN PATENT DOCUMENTS

| | | |
|---|---|---|
| JP | 2014116129 A | 6/2014 |
| JP | 2016143527 A | 8/2016 |
| JP | 2016162517 A | 9/2016 |
| JP | 2018147726 A | 9/2018 |
| WO | 2012080826 A1 | 6/2012 |

* cited by examiner

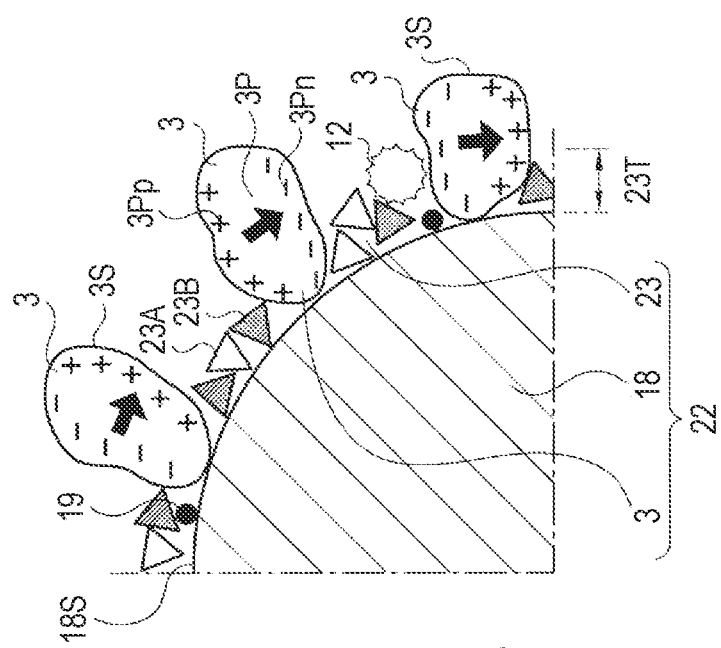
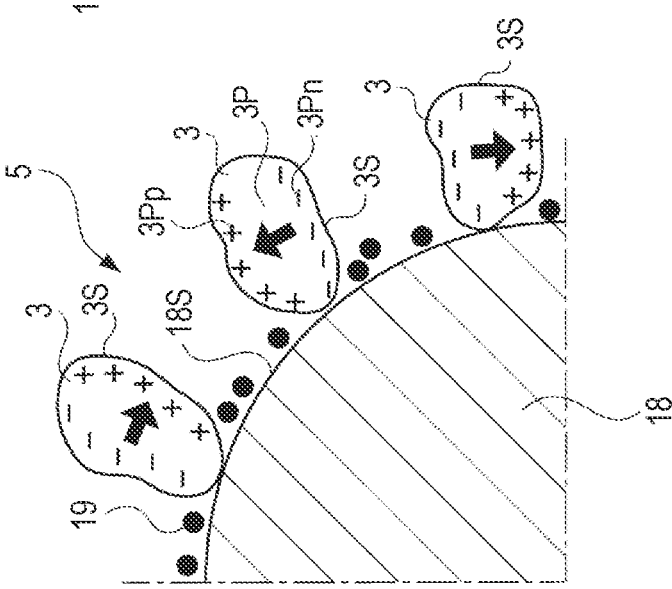
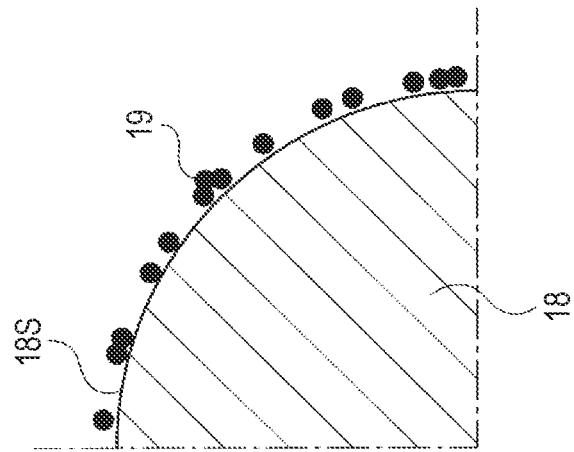

WET MIXTURE, COATED LITHIUM-CONTAINING POSITIVE ELECTRODE ACTIVE MATERIAL PARTICLES, AND METHOD OF PRODUCING LITHIUM ION SECONDARY BATTERY, AND WET MIXTURE, COATED LITHIUM-CONTAINING POSITIVE ELECTRODE ACTIVE MATERIAL PARTICLES, AND LITHIUM ION SECONDARY BATTERY

RELATED APPLICATION

This application is a divisional application of U.S. application Ser. No. 16/886,877, filed on May 29, 2020, including the specification, drawings and abstract, the entire disclosure of which is incorporated herein by reference.

INCORPORATION BY REFERENCE

The disclosure of Japanese Patent Application No. 2019-104929 filed on Jun. 5, 2019 including the specification, drawings and abstract is incorporated herein by reference in its entirety.

BACKGROUND

1. Technical Field

The present disclosure relates to a wet mixture, coated lithium-containing positive electrode active material particles, and a method of producing a lithium ion secondary battery, a wet mixture, coated lithium-containing positive electrode active material particles, and a lithium ion secondary battery.

2. Description of Related Art

In the related art, such as Japanese Unexamined Patent Application Publication No. 2018-147726 (JP 2018-147726 A), a technology in which, in order to reduce the battery resistance of a lithium ion secondary battery, a coating which is made of a lithium ion conductor or in which a ferroelectric material such as $BaTiO_3$ is dispersed is formed on the surface of positive electrode active material particles composed of a lithium-containing composite oxide is known. In the technology described in Patent Document 1, a positive electrode active material is put into a solution in which, for example, a lithium alkoxide, a tungsten alkoxide and the like are dissolved and the solution is stirred, and heating is then performed at a high temperature of 700° C., a first layer composed of a $Li_2WO_4$ lithium ion conductor is formed, and additionally, the positive electrode active material is put into a second solution in which a lithium alkoxide, a tungsten alkoxide, a barium alkoxide, a titanium alkoxide and the like are dissolved and the solution is stirred, and heating is then performed at a high temperature of 700° C., a second layer composed of a $Li_2WO_4$ lithium ion conductor and a $BaTiO_3$ ferroelectric material is formed, and a lithium ion conductor coating in which the ferroelectric material is dispersed on the positive electrode active material is formed.

SUMMARY

However, in the technology described in Patent Document 1, a high temperature treatment is necessary and costs increase, and a coating made of a crystalline lithium ion conductor has a lower lithium ion conductivity than an amorphous lithium ion conductor, and only ferroelectric particles having a size equal to or smaller than that of the coating are generated, and there is a limit to reducing the battery resistance of the lithium ion secondary battery.

The present disclosure has been made in view of such problems, and provides a method of producing a wet mixture containing positive electrode active material particles that can constitute a positive electrode plate having a low reaction resistance, a method of producing coated lithium-containing positive electrode active material particles that can constitute a positive electrode plate having a low reaction resistance, and a method of producing a lithium ion secondary battery having a low resistance. In addition, the present disclosure provides a wet mixture containing positive electrode active material particles that can constitute a positive electrode plate having a low reaction resistance, coated lithium-containing positive electrode active material particles that can constitute a positive electrode plate having a low reaction resistance, and a lithium ion secondary battery having a low resistance.

(1) In order to address the above problems, an aspect of the present disclosure provides a method of producing a wet mixture, including: a stirring and mixing process in which lithium-containing positive electrode active material particles having surplus lithium compounds on the surface and crystalline ferroelectric ceramic particles are dried, stirred and mixed to obtain a mixed powder; and a solution mixing process in which a lithium conductor forming solution is mixed with the mixed powder to obtain a wet mixture containing coated lithium-containing positive electrode active material particles having a coating which is made of an amorphous lithium conductor and in which the ferroelectric ceramic particles are dispersed on the surface of the lithium-containing positive electrode active material particles.

According to the method of producing a wet mixture, it is possible to obtain a wet mixture containing coated lithium-containing positive electrode active material particles having a coating which is made of an amorphous lithium conductor and in which ferroelectric ceramic particles are dispersed on the surface of the lithium-containing positive electrode active material particles.

Here, in the coating made of a lithium conductor, ferroelectric ceramic particles are dispersed, and the coating made of a lithium conductor is interposed between the lithium-containing positive electrode active material particles and the ferroelectric ceramic particles, and is formed around the ferroelectric ceramic particles attached to the surface of the lithium-containing positive electrode active material particles. In addition, in crystalline ferroelectric ceramic particles, polarized charges are generated on the surface of the particles due to spontaneous polarization.

Therefore, in a lithium ion secondary battery using such coated lithium-containing positive electrode active material particles in a positive electrode layer of a positive electrode plate, when lithium ions are desorbed from lithium-containing positive electrode active material particles and move toward a negative electrode during charging, the lithium ions desorbed from the lithium-containing positive electrode active material particles diffuse into an electrolytic solution through the lithium conductor coating provided on the surface of the lithium-containing positive electrode active material particles. In addition, the lithium ions that have reached the coating move by being attracted by negative charges of polarized charges generated by the ferroelectric ceramic particles on the surface of the particles and are released in a solvated state in the electrolytic solution. Therefore, lithium ions can be smoothly released from the surface of the lithium-containing positive electrode active material particles into the electrolytic solution. On the other hand, during discharging, the lithium ions that have moved in a solvated state in the electrolytic solution quickly move by being attracted by negative charges of polarized charges on the surface of the ferroelectric ceramic particles and reach the lithium conductor coating, and are smoothly inserted into the lithium-containing positive electrode active material particles via the coating. Thus, during charging and discharging, transfer of lithium ions between the lithium-containing positive electrode active material particles and the electrolytic solution becomes easier, and the reaction resistance of the positive electrode plate, and consequently, the resistance of the lithium ion secondary battery can be reduced.

Here, in the coated lithium-containing positive electrode active material particles contained in the wet mixture, ferroelectric ceramic particles that are dispersed are positioned on the surface of the lithium-containing positive electrode active material particles, and in some thereof, ferroelectric ceramic particles are fixed to the surface of the lithium-containing positive electrode active material particles due to a mechanochemical reaction caused by the contact between the lithium-containing positive electrode active material particles and the ferroelectric ceramic particles.

Here, "lithium-containing positive electrode active material particles" are particles that contain elemental lithium and can occlude and release lithium ions as a positive electrode active material. Regarding such a particle material, a lithium-containing compound containing elemental lithium and one, two or more transition metal elements (for example, a lithium transition metal composite oxide) can be used without particular limitation. Preferred examples thereof include a lithium transition metal oxide having a layered rock salt type or spinel type crystal structure. Examples of such a lithium transition metal oxide include a lithium nickel composite oxide (for example, $LiNiO_2$), a lithium cobalt composite oxide (for example, $LiCoO_2$), a lithium manganese composite oxide (for example, $LiMn_2O_4$), and a ternary lithium-containing composite oxide such as a lithium nickel cobalt manganese composite oxide (for example, $LiNi_{1/3}Co_{1/3}Mn_{1/3}O_2$). In addition, phosphates containing lithium and a transition metal element as constituent metal elements such as lithium manganese phosphate (for example, $LiMnPO_4$) and lithium iron phosphate (for example, $LiFePO_4$) may be exemplified. In addition, "surplus lithium compound" is a lithium compound (for example, $Li_2O$ and LiOH) which is present on the surface of lithium-containing positive electrode active material particles and is not a lithium transition metal oxide which is the positive electrode active material.

The "lithium conductor forming solution" is a solution in which an aqueous solvent or a non-aqueous solvent such as NMP is used as a solvent, and which contains a "lithium conductor precursor" that can form a lithium conductor coating on the surface of active material particles according to a reaction with surplus lithium compounds on the surface of lithium-containing positive electrode active material particles. Examples of such a "lithium conductor precursor" include a substance that is dissolved in a solvent such as water and NMP and becomes a "lithium conductor" according to substitution of Li ions and H ions of surplus lithium compounds ($Li_2O$, LiOH and the like) present on the surface of lithium-containing positive electrode active material particles, and specifically, include orthophosphoric acid ($H_3PO_4$), pyrophosphoric acid (diphosphoric acid, $H_4P_2O_7$), triphosphoric acid ($H_5P_3O_{10}$), polyphosphoric acid ($H(HPO_3)_nOH$), phosphoric acid concentrates containing these, and diphosphorus pentaoxide ($P_4O_{10}$). In addition, phosphoric acid-based substances such as lithium hydrogen phosphate ($Li_2HPO_4$) may be exemplified. In addition, examples of a substance other than phosphoric acid-based substances include tungstic acid ($H_2WO_4$), lithium hydrogen tungstate ($LiHWO_4$), and niobic acid ($HNbO_3$). In addition, examples of a "coating made of a lithium conductor" formed on the surface of lithium-containing positive electrode active material particles include coatings made of $Li_3PO_4$, $Li_2HPO_4$, $LiH_2PO_4$, $Li_2WO_4$, $LiHWO_4$, $LiNbO_3$, or the like. The lithium conductor forming this coating is amorphous and has better lithium conductivity than a crystalline lithium conductor that is crystallized by heating or the like. In addition, examples of a solvent used in the "lithium conductor forming solution" include water, an aqueous solvent containing water, and various non-aqueous solvents, for example, an "aprotic polar solvent", such as dimethylformamide (DMF), dimethylacetamide (DMA), and dimethyl sulfoxide (DMSO) in addition to NMP.

"Ferroelectric ceramic particles" are ferroelectric ceramic particles having spontaneous polarization, and examples thereof include perovskite metal oxides such as $BaTiO_3$, $SrTiO_3$, and $(Ba, Sr)TiO_3$. In addition, a perovskite metal oxide which is represented by a general formula $ABO_3$ and in which, for example, at least one selected from the group consisting of Pb, Ba, Sr, Bi, Li, Na, Ca, Cd, Mg, K, and lanthanoid elements, is used as a metal element at the A site, and, for example, at least one selected from the group consisting of Ti, Zr, V, Nb, Ta, Sb, Cr, Mo, W, Mn, Mg, Sc, Co, Cu, In, Sn, Ga, Zn, Cd, Fe, Ni, Hf, and Al, is used as a metal element at the B site may be used. Other examples include ferroelectrics having a high dielectric constant such as $CaCuTi_4O_{12}$, and $Sr_2Ta_2O_7$.

In addition, the "wet mixture" is a non-fluid substance in which a powder composed of coated lithium-containing positive electrode active material particles is wetted by a solvent such as a solvent contained in the lithium conductor forming solution and becomes wet. The solid content ratio (a proportion of the solid content) NV in such a wet mixture is generally 70% or more and preferably 90% or more.

(2) In addition, in the method of producing a wet mixture (1), the ferroelectric ceramic particles may be larger than a film thickness of the coating.

In the method of producing a wet mixture, regarding the ferroelectric ceramic particles, particles larger than the film thickness of the coating are used. Therefore, on the surface of the lithium-containing positive electrode active material particles, ferroelectric ceramic particles protrude from the coating made of a lithium conductor, and a part of the surface of each of the ferroelectric ceramic particles is likely to be exposed. Then, when the battery is charged, lithium ions move from the inside of the lithium-containing positive electrode active material particles to the surface of the ferroelectric ceramic particles exposed from the coating through the coating made of a lithium conductor, and additionally, move by being attracted by the negative charges due to spontaneous polarization and are easily released in a solvated state in the electrolytic solution. Therefore, lithium ions can be more smoothly released from the surface of the lithium-containing positive electrode active material particles in the electrolytic solution. On the other hand, when the battery is discharged, lithium ions that have moved in a solvated state in the electrolytic solution reach the coating made of a lithium conductor through the exposed surface of the ferroelectric ceramic particles, and are inserted into the lithium-containing positive electrode active material particles via the coating. Therefore, the lithium ions can be more smoothly inserted into the lithium-containing positive electrode active material particles through the surface of the lithium-containing positive electrode active material particles. Thus, during charging and discharging, transfer of lithium ions between the lithium-containing positive electrode active material particles and the electrolytic solution becomes easier, and the reaction resistance of the positive electrode plate can be further reduced.

(3) In addition, in the method of producing a wet mixture according to (1) or (2), the lithium-containing positive electrode active material particles may have at least one of $Li_2O$ and LiOH on the surface as the surplus lithium compounds.

In the method of producing a wet mixture, the lithium-containing positive electrode active material particles have at least of $Li_2O$ and LiOH on the surface as the surplus lithium compounds. Therefore, when the lithium conductor forming solution is applied, a lithium conductor such as $Li_3PO_4$, $Li_2HPO_4$, $LiH_2PO_4$, $Li_2WO_4$, $LiHWO_4$, and $LiNbO_3$ can be reliably formed on the surface of the lithium-containing positive electrode active material particles.

(4) In addition, in the method of producing a wet mixture according to any one of (1) to (3), in the lithium conductor forming solution, at least one of orthophosphoric acid ($H_3PO_4$), pyrophosphoric acid ($H_4P_2O_7$), triphosphoric acid ($H_5P_3O_{10}$), polyphosphoric acid ($H(HPO_3)_nOH$), phosphoric acid concentrates, diphosphorus pentaoxide ($P_4O_{10}$), and lithium hydrogen phosphate ($Li_2HPO_4$) may be dissolved.

In the method of producing a wet mixture, as a lithium conductor precursor that is dissolved in the lithium conductor forming solution, a phosphate compound such as orthophosphoric acid ($H_3PO_4$) is dissolved, and a lithium phosphate such as a lithium conductor is formed. Phosphate compounds such as orthophosphoric acid are inexpensive compared to other substances that become a lithium conductor such as tungstic acid ($H_2WO_4$) and niobic acid ($HNbO_3$) and thus a wet mixture can be produced at low cost.

(a) In addition, in the method of producing a wet mixture according to any one of (1) to (4), preferably, the coating contains at least one of lithium phosphate ($Li_3PO_4$), lithium hydrogen phosphate ($Li_2HPO_4$), and lithium dihydrogen phosphate ($LiH_2PO_4$).

In the method of producing a wet mixture, the coating made of a lithium conductor formed on the coated lithium-containing positive electrode active material particles becomes a lithium phosphate coating containing at least one of lithium phosphate ($Li_3PO_4$), lithium hydrogen phosphate ($Li_2HPO_4$), and lithium dihydrogen phosphate ($LiH_2PO_4$). Therefore, inexpensive coated lithium-containing positive electrode active material particles can be obtained.

(5) In addition, in the method of producing a wet mixture according to any one of (1) to (4), and (a), the lithium conductor forming solution may be a non-aqueous solution using N-methylpyrrolidone as a solvent.

In the method of producing a wet mixture, since NMP is used as a solvent of the lithium conductor forming solution, when it is mixed with a mixed powder, a lithium reduction layer that is less likely to transfer lithium ions is not formed on a part of the surface of the lithium-containing positive electrode active material particles, and a coating made of a lithium conductor in which ferroelectric ceramic particles are dispersed can be directly formed on the surface of the lithium-containing positive electrode active material particles. Therefore, in particular, lithium ions easily move and the reaction resistance can be reduced. Here, the "lithium reduction layer" is a layer which can be formed on a part of the surface of "lithium-containing positive electrode active material particles" according to elution of lithium ions from the surface of lithium-containing positive electrode active material particles and has a composition with a lower lithium ion content than the original composition.

(6) Another solution is to provide a method of producing coated lithium-containing positive electrode active material particles including a mixture drying process in which the wet mixture produced in the method of producing a wet mixture according to any one of (1) to (5) is dried to obtain the coated lithium-containing positive electrode active material particles.

In the method of producing coated lithium-containing positive electrode active material particles, since the wet mixture is produced by being dried in the mixture drying process, the coated lithium-containing positive electrode active material particles can be easily obtained.

(b) In addition, a method of producing a positive electrode plate including an undried positive electrode layer forming process in which an undried positive electrode layer containing the wet mixture produced in the method of producing a wet mixture according to any one of (1) to (5) is formed on a positive electrode current collecting plate and a positive electrode layer drying process in which the undried positive electrode layer is dried and a positive electrode layer is formed on the positive electrode current collecting plate is preferable.

In the method of producing a positive electrode plate, the positive electrode layer obtained by drying the wet mixture is formed on the positive electrode current collecting plate. In addition, since the coated lithium-containing positive electrode active material particles are obtained without first drying the wet mixture, it is possible to eliminate a number of processes and costs for drying the wet mixture, and production is possible at low cost. Therefore, it is possible to produce a positive electrode plate having a positive electrode layer containing coated lithium-containing positive electrode active material particles having lithium ion conductivity and having a low reaction resistance at low cost.

Here, in the undried positive electrode layer forming process, an appropriate method can be used as a method of forming an undried positive electrode layer on a positive electrode current collecting plate. Examples thereof include a method in which a binding agent is added to a wet mixture or a solvent is additionally added to form an active material paste and the paste is applied using a die coater and a method in which an active material paste is applied to a positive electrode current collecting plate using a blade. In addition, a method in which a binding agent and the like are mixed with a wet mixture and granulated once to form a wet granulated body and an undried positive electrode layer is formed on a positive electrode current collecting plate using a three-roll transfer device may be exemplified.

(c) In addition, a method of producing a positive electrode plate including an undried positive electrode layer forming process in which an undried positive electrode layer containing the coated lithium-containing positive electrode active material particles produced in the (6) method of producing coated lithium-containing positive electrode active material particles is formed on a positive electrode current collecting plate and a positive electrode layer drying process in which the undried positive electrode layer is dried and a positive electrode layer is formed on the positive electrode current collecting plate is preferable.

In the method of producing a positive electrode plate, a positive electrode layer is formed by forming an undried positive electrode layer containing the coated lithium-containing positive electrode active material particles obtained in the above mixture drying process on a positive electrode current collecting plate and drying it. Therefore, it is possible to easily produce a positive electrode plate having a positive electrode layer containing coated lithium-containing positive electrode active material particles having lithium ion conductivity and having a low reaction resistance.

Here, in the undried positive electrode layer forming process, an appropriate method can be used as a method of forming an undried positive electrode layer containing coated lithium-containing positive electrode active material particles on a positive electrode current collecting plate. Examples thereof include a method in which a binding agent and a solvent are added to coated lithium-containing positive electrode active material particles to form an active material paste, and the paste is applied using a die coater, and a method in which an active material paste is applied to a positive electrode current collecting plate using a blade. A method in which a binding agent, a solvent, and the like are mixed with coated lithium-containing positive electrode active material particles to form a mixed component in a wet state, this is granulated once to form a wet granulated body, and an undried positive electrode layer is formed on a positive electrode current collecting plate using a three-roll transfer device may be exemplified.

(d) In addition, a method of producing a lithium ion secondary battery including an electrode body forming process in which an electrode body is formed using the positive electrode plate produced in the (b) or (c) method of producing a positive electrode plate is preferable.

(7) In addition, still another solution is to provide a method of producing a lithium ion secondary battery including an electrode body forming process in which an electrode body is formed using a positive electrode plate containing the coated lithium-containing positive electrode active material particles which are contained in the wet mixture produced in the method of producing a wet mixture according to any one of (1) to (5) or produced in the (6) method of producing coated lithium-containing positive electrode active material particles in a positive electrode layer.

In the method of producing a lithium ion secondary battery, since an electrode body is formed using the above positive electrode plate having a low reaction resistance, a lithium ion secondary battery having a low resistance can be produced.

(8) In addition, yet another solution is to provide a wet mixture including coated lithium-containing positive electrode active material particles including lithium-containing positive electrode active material particles and a coating which is formed on the surface of the lithium-containing positive electrode active material particles and made of an amorphous lithium conductor, and in which crystalline ferroelectric ceramic particles are dispersed, and a solvent.

The wet mixture contains coated lithium-containing positive electrode active material particles and a solvent. Therefore, when the wet mixture is applied to a positive electrode current collecting plate and dried, a positive electrode plate having a low reaction resistance can be easily obtained. Alternatively, if the wet mixture is dried, coated lithium-containing positive electrode active material particles having favorable lithium ion conductivity can be obtained. In addition, since the lithium conductor forming a coating is amorphous, the lithium conductivity is more favorable with the coated lithium-containing positive electrode active material particles than with a crystalline lithium conductor coating.

Here, examples of a solvent (dispersion medium) contained in the wet mixture include water, an aqueous solvent, and a non-aqueous solvent such as NMP. Among non-aqueous solvents, NMP is preferably used.

(e) In addition, in the (8) wet mixture, the ferroelectric ceramic particles are preferably larger than a film thickness of the lithium conductor forming the coating.

In the coated lithium-containing positive electrode active material particles contained in the wet mixture, ferroelectric ceramic particles are larger than a film thickness of the lithium conductor forming the coating. Therefore, on the surface of the lithium-containing positive electrode active material particles, ferroelectric ceramic particles protrude from the coating made of a lithium conductor, and a part of the surface of each of the ferroelectric ceramic particles is exposed. Thus, as described above, during charging and discharging of the battery, lithium ions can be smoothly released from the surface of the lithium-containing positive electrode active material particles in an electrolytic solution or lithium ions can be smoothly inserted into the particles from the electrolytic solution through the surface of the lithium-containing positive electrode active material particles. Thus, during charging and discharging, transfer of lithium ions between the lithium-containing positive electrode active material particles and the electrolytic solution becomes easier, and the reaction resistance of the positive electrode plate can be further reduced.

(f) In addition, in the wet mixture according to (8) or (e), preferably, the solvent is N-methylpyrrolidone, and in the coated lithium-containing positive electrode active material particles, the coating is directly formed on the surface of the lithium-containing positive electrode active material particles without a lithium reduction layer therebetween.

In the wet mixture, NMP is used as a solvent, and a coating is directly formed on the surface of lithium-containing positive electrode active material particles without a lithium reduction layer that is less likely to transfer lithium ions. Therefore, when the wet mixture is applied to a positive electrode current collecting plate and dried, a positive electrode plate having a lower reaction resistance can be obtained. Alternatively, if the wet mixture is dried, coated lithium-containing positive electrode active material particles having favorable lithium ion conductivity can be obtained.

(9) In addition, yet another solution is to provide coated lithium-containing positive electrode active material particles including lithium-containing positive electrode active material particles, and a coating which is formed on the surface of the lithium-containing positive electrode active material particles and made of an amorphous lithium conductor, and in which crystalline ferroelectric ceramic particles are dispersed.

The coated lithium-containing positive electrode active material particles have a coating which is composed of an amorphous lithium conductor and in which crystalline ferroelectric ceramic particles are dispersed as the coating. Therefore, during charging and discharging of a lithium ion secondary battery using the coated lithium-containing positive electrode active material particles in a positive electrode layer of a positive electrode plate, transfer of lithium ions between the lithium-containing positive electrode active material particles and the electrolytic solution can be easier. Thereby, the reaction resistance of the positive electrode plate is reduced and a lithium ion secondary battery having a low resistance can be obtained.

In addition, in the coated lithium-containing positive electrode active material particles, coated lithium-containing positive electrode active material particles which are directly formed on the surface of the lithium-containing positive electrode active material particles, wherein the coating does not have a lithium reduction layer on a part of the surface, are preferable. When a lithium reduction layer having low lithium ion conductivity is present on a part of the surface of the lithium-containing positive electrode active material particles, insertion and desorption of lithium ions into and from the lithium-containing positive electrode active material particles become difficult. On the other hand, since the coated lithium-containing positive electrode active material particles do not have a lithium reduction layer on a part of the surface thereof, lithium ions can be more smoothly inserted into and desorbed from the lithium-containing positive electrode active material particles, the reaction resistance of the positive electrode plate is reduced and a lithium ion secondary battery having a low resistance can be obtained.

(g) In addition, in the (9) coated lithium-containing positive electrode active material particles, preferably, the ferroelectric ceramic particles are larger than a film thickness of the coating.

In the coated lithium-containing positive electrode active material particles, ferroelectric ceramic particles larger than a film thickness of the coating are dispersed in the coating. Therefore, on the surface of the lithium-containing positive electrode active material particles, ferroelectric ceramic particles protrude from the coating, and a part of the surface of each of the ferroelectric ceramic particles is exposed. Therefore, as described above, during charging and discharging of the battery, lithium ions can be smoothly released from the surface of the lithium-containing positive electrode active material particles in an electrolytic solution or lithium ions can be smoothly inserted into the particles from the electrolytic solution through the surface of the lithium-containing positive electrode active material particles. Thus, during charging and discharging, transfer of lithium ions between the lithium-containing positive electrode active material particles and the electrolytic solution becomes easier, and the reaction resistance of the positive electrode plate can be further reduced.

(h) In addition, a positive electrode plate having a positive electrode layer containing the coated lithium-containing positive electrode active material particles obtained by drying the wet mixture according to any one of (8), (e), and (f) on the positive electrode current collecting plate is preferable.

In the positive electrode plate, since the positive electrode layer is formed by drying the wet mixture, the positive electrode plate can be easily formed and the positive electrode layer containing the coated lithium-containing positive electrode active material particles is provided, and thus a positive electrode plate having a low reaction resistance can be obtained.

(i) In addition, a positive electrode plate having a positive electrode layer containing the coated lithium-containing positive electrode active material particles according to (9) or (g) on the positive electrode current collecting plate may be obtained.

In the positive electrode plate, since the positive electrode layer containing the coated lithium-containing positive electrode active material particles is provided, a positive electrode plate having a low reaction resistance can be obtained.

(j) In addition, a lithium ion secondary battery including an electrode body including the positive electrode plate according to (h) or (i) is preferable.

In the lithium ion secondary battery, since the above positive electrode plate having a low reaction resistance is used, the battery can be suitably used as a low resistance battery. (10) In addition, another solution is to provide a lithium ion secondary battery including an electrode body using a positive electrode plate containing coated lithium-containing positive electrode active material particles, which are contained in the wet mixture according to (8) or according to (9), in a positive electrode layer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2A is a schematic view showing a surface state of lithium-containing positive electrode active material particles as a starting material;

FIG. 2B is a schematic view showing a state in which ferroelectric ceramic particles are attached to the surface of lithium-containing positive electrode active material particles;

FIG. 2C is a schematic view showing a surface state of coated lithium-containing positive electrode active material particles on which a coating is directly formed on the surface of lithium-containing positive electrode active material particles to which ferroelectric ceramic particles are attached according to Embodiment 1;

FIG. 3 is a graph showing a magnitude of a reaction resistance in a sample battery with no treatment (without mixing in a lithium conductor forming solution), a sample battery using a positive electrode plate produced using a wet mixture of Embodiment 1 in which an NMP lithium conductor forming solution is mixed in, and a sample battery using a positive electrode plate produced using a wet mixture of Embodiment 2 in which an aqueous lithium conductor forming solution is mixed in;

DETAILED DESCRIPTION OF EMBODIMENTS

Figure 1:
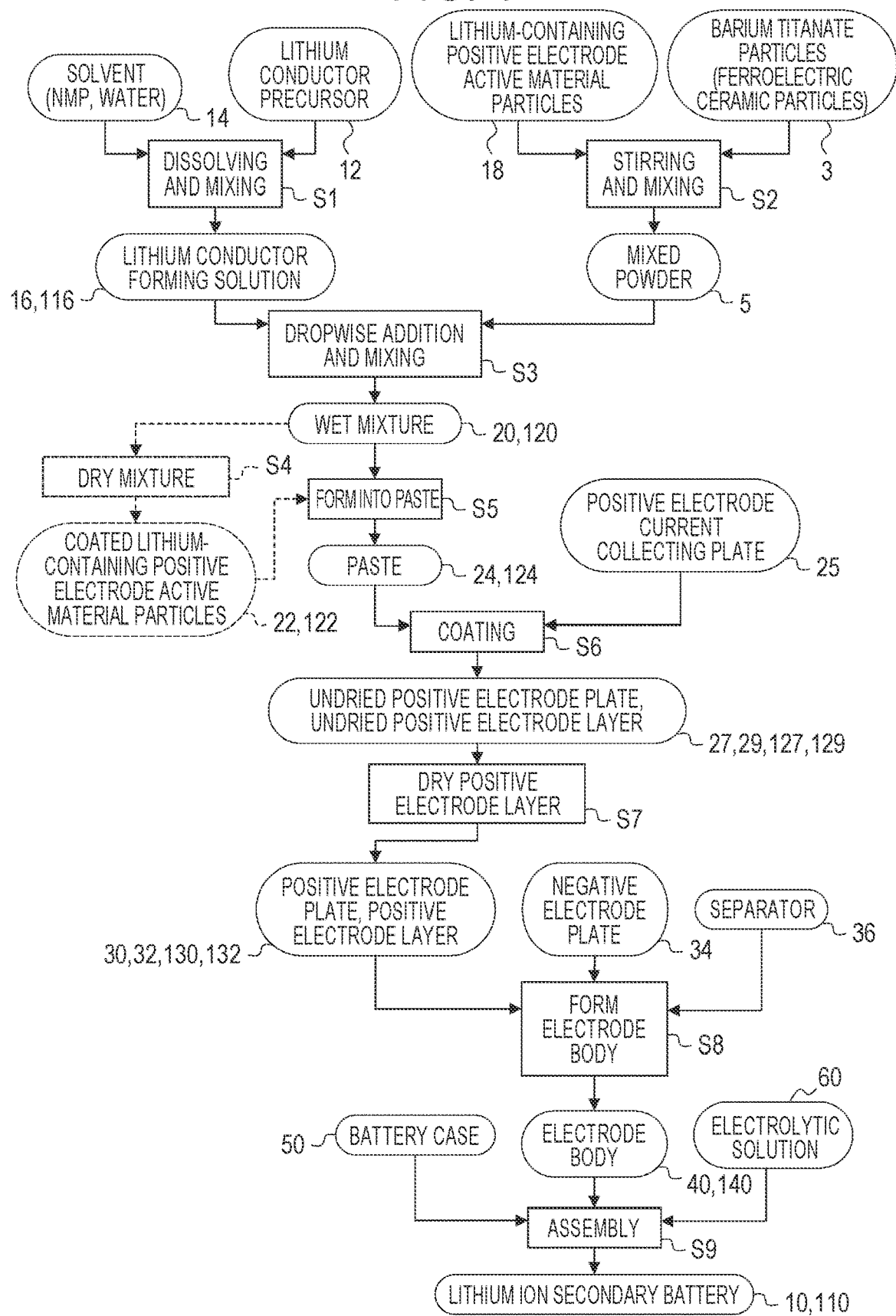
FIG. 1 is a flowchart showing a process of producing a wet mixture, a positive electrode plate, and a battery according to Embodiments 1 and 2.

Hereinafter, embodiments of the present disclosure will be described with reference to the drawings. Here, in the drawings to be described below, members and portions having the same functions are denoted with the same reference numerals and redundant descriptions thereof will be omitted or simplified. In addition, the sizes (a length, a width, a thickness, and the like) in the drawings do not reflect actual sizes. In addition, components other than those particularly mentioned in this specification that are necessary for implementation of the disclosure can be recognized by those skilled in the art as design matters based on the related art in the field. FIG. 1 is a flowchart showing a process of producing a wet mixture, a positive electrode plate, and a battery according to Embodiments 1 and 2.

Embodiment 1

First, production of a wet mixture 20 will be described. First, in a dissolving and mixing process S1, a lithium conductor precursor 12 is mixed with and dissolved in N-methylpyrrolidone (NMP) 14 to obtain a lithium conductor forming solution 16. The lithium conductor precursor 12 is a substance that, when the lithium conductor forming solution 16 is brought into contact with lithium-containing positive electrode active material particles 18 to be described below, reacts with surplus lithium compounds 19 such as $Li_2O$ and LiOH present on a surface 18S of the lithium-containing positive electrode active material particles 18 and can form a lithium conductor coating 23 on the surface 18S. In the present embodiment, regarding the lithium conductor precursor 12, a phosphoric acid concentrate obtained by heating and concentrating orthophosphoric acid ($H_3PO_4$) with a concentration of 85% to 80% is used. The phosphoric acid concentrate includes orthophosphoric acid ($H_3PO_4$), pyrophosphoric acid ($H_4P_2O_7$), triphosphoric acid ($H_5P_3O_{10}$), and polyphosphoric acid ($H(HPO_3)_nOH$). Specifically, the phosphoric acid concentrate (lithium conductor precursor) 12 is added to N-methylpyrrolidone (NMP) 14 and mixed and dissolved to reach 10 wt %.

Here, in Embodiment 1 in which NMP 14 is used as an solvent, in addition to the above phosphoric acid concentrate, orthophosphoric acid ($H_3PO_4$), pyrophosphoric acid ($H_4P_2O_7$), or triphosphoric acid ($H_5P_3O_{10}$) is preferably used in the lithium conductor precursor 12. This is because phosphoric acid-based substances are relatively inexpensive. In addition, tungstic acid ($H_2WO_4$), niobic acid ($HNbO_3$), and the like can be used.

On the other hand, regarding the lithium-containing positive electrode active material particles 18, lithium nickel cobalt manganese composite oxide ($LiNi_{1/3}Co_{1/3}Mn_{1/3}O_2$) with an average particle size 18 Da of 5.1 μm are prepared. The surplus lithium compounds 19 such as $Li_2O$ and LiOH are present on the surface 18S of the lithium-containing positive electrode active material particles 18 (refer to FIG. 2A). In addition, regarding barium titanate particles 3, a barium titanate ($BaTiO_3$) sintered body crystallized by sintering is pulverized to prepare a crystalline fine powder with an average particle size 3 Da of 0.2 μm. The average particle size 3 Da of the barium titanate particles 3 is a size of 1/10 or less of the average particle size 18 Da of the lithium-containing positive electrode active material particles 18. Here, in Example 1, those obtained by pulverizing a sintered body are used as the barium titanate particles 3, but spherical barium titanate particles can be used.

Then, in a stirring and mixing process S2, the prepared lithium-containing positive electrode active material particles 18 and the barium titanate particles 3 are dried, stirred and mixed to obtain a mixed powder 5. Specifically, 200 g of the lithium-containing positive electrode active material particles 18 (refer to FIG. 2A) are weighed out and put into a mixer (not shown), which is closed with a lid. The mixer is driven at 800 rpm for 5 seconds, and the lithium-containing positive electrode active material particles 18 are stirred and loosened. Then, an input port of the mixer is opened, and 0.5 mol % of the barium titanate fine powder particles 3 are put thereinto, and the mixer is driven and the particles are stirred at 800 rpm for 5 minutes to obtain the mixed powder 5 (refer to FIG. 2B). In the mixed powder 5, the barium titanate particles 3 are dispersed and positioned around the surface 18S of the lithium-containing positive electrode active material particles 18. In addition, in some thereof, the barium titanate particles 3 are fixed to the surface 18S of the lithium-containing positive electrode active material particles 18 due to a mechanochemical reaction caused by the contact between the lithium-containing positive electrode active material particles 18 and the barium titanate particles 3.

Subsequently, in a dropwise addition and mixing process (solution mixing process) S3, while the mixed powder 5 is stirred, the lithium conductor forming solution 16 is added dropwise to and mixed with the mixed powder 5. Specifically, the input port of the above mixer containing the mixed powder 5 is opened, and within the first 10 seconds of driving the mixer at 800 rpm for 15 seconds, 5 g of the lithium conductor forming solution 16 divided by a syringe is added dropwise and mixed in. The lid of the mixer is closed, and the mixed powder 5 is mixed with a spatula (the mixed powder 5 attached to a stirring blade of the mixer is mixed). In addition, the lid of the mixer is opened, the mixer is driven at 800 rpm for 15 seconds, and the mixed powder 5 and the lithium conductor forming solution 16 are mixed together. The lid of the mixer is opened again, and a mixture of the mixed powder 5 and the lithium conductor forming solution 16 are mixed with a spatula. The input port of the mixer is opened, and within the first 10 seconds of driving the mixer at 800 rpm for 15 seconds, 5 g of the lithium conductor forming solution 16 divided by a syringe is added dropwise and mixed in (a total of 10 g is put into). The lid of the mixer is opened again, and a mixture of the mixed powder 5 and the lithium conductor forming solution 16 are mixed with a spatula. In addition, the lid of the mixer is closed, and the mixer is driven at 800 rpm for 15 seconds, and the mixture is stirred.

When the lithium conductor forming solution 16 is brought into contact with the lithium-containing positive electrode active material particles 18 forming the mixed powder 5, the surplus lithium compounds 19 such as $Li_2O$ and LiOH on the surface 18S react with polyphosphoric acid or the like contained in the lithium conductor forming solution 16, and are changed to a lithium phosphate conductor 23A made of $Li_3PO_4$ or the like or to a lithium hydrogen phosphate conductor 23B made of $Li_2HPO_4$, $LiH_2PO_4$, or the like according to substitution of Li ions and H ions. Thus, the coating 23 which has a film thickness 23T of about 1 nm, is made of an amorphous lithium conductor, and has favorable lithium ion conductivity is directly formed on the surface 18S of the lithium-containing positive electrode active material particles 18 (refer to FIG. 2C). Here, it is sufficient that the film thickness 23T of the coating 23 be very thin, and, for example, a very thin coating 23 having the film thickness 23T of 0.5 nm to several nm, and preferably the thickness of 0.5 nm to 1.5 nm.

In the coating 23, the average particle size 3 Da (in Embodiment 1, 3 Da=0.2 μm) of the barium titanate particles 3 dispersed is much larger than the film thickness 23T of the coating 23. Therefore, as exemplified in FIG. 2C, the barium titanate particles 3 protrude from the coating 23. In addition, a part of a surface 3S of the barium titanate particles 3 is exposed from the coating 23. Here, the same applies to the relationship between the film thickness 123T of a coating 123 and the barium titanate particles 3 in Embodiment 2 to be described below.

Thus, according to the production method, it is possible to obtain the wet mixture 20 containing coated lithium-containing positive electrode active material particles 22 having the coating 23 which is made of an amorphous lithium conductor and in which ferroelectric ceramic particles 3 are dispersed on the surface 18S of the lithium-containing positive electrode active material particles 18. Here, the wet mixture 20 of Embodiment 1 has a solid content ratio NV of 95%.

In a lithium ion secondary battery 10 in which such coated lithium-containing positive electrode active material particles 22 are used in a positive electrode layer 32 of a positive electrode plate 30 to be described below, during charging, when lithium ions Li$^+$ are desorbed from the lithium-containing positive electrode active material particles 18 and move toward a negative electrode plate 34, the lithium ions Li$^+$ desorbed from the lithium-containing positive electrode active material particles 18 pass through the lithium conductor coating 23 provided on the surface 18S of the lithium-containing positive electrode active material particles 18 and diffuse into an electrolytic solution 60. In addition, the lithium ions that have reached the coating 23 move by being attracted by negative charges 3Pn of polarized charges (positive charges 3Pp and negative charges 3Pn) generated by the spontaneous polarization 3P in the ferroelectric ceramic particles 3 on the surface 3S of the particles and are released in a solvated state in the electrolytic solution 60. Therefore, lithium ions can be smoothly released from the surface 18S of the lithium-containing positive electrode active material particles 18 into the electrolytic solution 60. On the other hand, during discharging, the lithium ions Li$^+$ that have moved in a solvated state in the electrolytic solution 60 quickly move by being attracted by negative charges 3Pn on the surface 3S of the ferroelectric ceramic particles 3 and reach the coating 23 made of a lithium conductor. Then, the lithium ions are smoothly inserted into the lithium-containing positive electrode active material particles 18 via the coating 23. Thus, during charging and discharging, transfer of lithium ions between the lithium-containing positive electrode active material particles 18 and the electrolytic solution 60 becomes easier, and the reaction resistance of the positive electrode plate 30, and consequently, the resistance of the lithium ion secondary battery 10 can be reduced.

Here, the wet mixture 20 contains the coated lithium-containing positive electrode active material particles 22 having lithium ion conductivity and NMP 14 as a solvent. Therefore, as will be described below, when the wet mixture 20 is applied to a positive electrode current collecting plate 25 and dried, it is possible to easily obtain the positive electrode plate 30 having a low reaction resistance. Alternatively, if the wet mixture 20 is dried, the coated lithium-containing positive electrode active material particles 22 having favorable lithium ion conductivity can be obtained.

In particular, in the production method in Embodiment 1, the average particle size 3 Da of the barium titanate particles 3 which are ferroelectric ceramic particles is larger than the film thickness 23T of the coating 23 (refer to FIG. 2C). Therefore, on the surface 18S of the lithium-containing positive electrode active material particles 18, the barium titanate particles 3 protrude from the coating 23, and a part of the surface 3S of each of the barium titanate particles 3 is likely to be exposed from the coating 23. Then, when the battery 10 is charged, lithium ions move from the inside of the lithium-containing positive electrode active material particles 18 to the surface 3S of the ferroelectric ceramic particles 3 exposed from the coating 23 through the coating 23 made of a lithium conductor, and additionally, move by being attracted by the negative charges 3Pn due to spontaneous polarization and are easily released in a solvated state in the electrolytic solution 60. On the other hand, when the battery 10 is discharged, lithium ions that have moved in a solvated state in the electrolytic solution 60 reach the coating 23 through the exposed surface 3S of the ferroelectric ceramic particles 3, and are smoothly inserted into the lithium-containing positive electrode active material particles 18 via the coating 23. Thus, during charging and discharging, transfer of lithium ions between the lithium-containing positive electrode active material particles 18 and the electrolytic solution 60 becomes easier, and the reaction resistance of the positive electrode plate 30 can be reduced.

In particular, in the production method in Embodiment 1, the lithium-containing positive electrode active material particles 18 made of a lithium nickel cobalt manganese composite oxide ($LiNi_{1/3}Co_{1/3}Mn_{1/3}O_2$) are used. Since the active material particles 18 have $Li_2O$ and LiOH on the surface 18S as surplus lithium compounds, the coating 23 made of a lithium conductor such as $Li_3PO_4$, $Li_2HPO_4$, and $LiH_2PO_4$ can be reliably formed by applying the lithium conductor forming solution 16.

Here, the presence of the coating 23 formed on the surface 18S of the lithium-containing positive electrode active material particles 18 can be confirmed by analysis using a general X-ray analysis method. In addition, confirmation may be performed by detecting a specific element (for example, elemental phosphorus) present on the surface of a positive electrode active material based on energy dispersive X-ray spectroscopy (EDS analysis method) using an analytical instrument.

In the production method of the present embodiment, a phosphoric acid concentrate is dissolved as the lithium conductor precursor 12 that is dissolved in the lithium conductor forming solution 16. Phosphate compounds such as a phosphoric acid concentrate form lithium phosphate as a lithium conductor. Phosphate compounds such as a phosphoric acid concentrate are inexpensive compared to other substances that become a lithium conductor such as tungstic acid ($H_2WO_4$) and niobic acid ($HNbO_3$) and allow the wet mixture 20 to be produced at low cost. In addition, in Embodiment 1, the lithium conductor coating 23 formed on the coated lithium-containing positive electrode active material particles 22 is a lithium phosphate coating 23 containing at least one of lithium phosphate ($Li_3PO_4$), lithium hydrogen phosphate ($Li_2HPO_4$), and lithium dihydrogen phosphate ($LiH_2PO_4$). Thereby, inexpensive coated lithium-containing positive electrode active material particles 22 can be obtained.

In addition, in the method of producing the wet mixture 20, since NMP 14 is used as a solvent of the lithium conductor forming solution 16, when it is mixed with the mixed powder 5, a lithium reduction layer RD that is less likely to transfer lithium ions is not formed on a part of the surface 18S of the lithium-containing positive electrode active material particles 18, the coating 23 made of a lithium conductor in which the ferroelectric ceramic particles 3 are dispersed is directly formed on the surface 18S of the lithium-containing positive electrode active material particles 18. Therefore, unlike coated lithium-containing positive electrode active material particles 122 of Embodiment 2 to be described below in which the lithium reduction layer RD (refer to FIG. 6C) is inserted into a part of the surface 18S, in Embodiment 1, when the wet mixture 20 is applied to the positive electrode current collecting plate 25 and dried, the positive electrode plate 30 having a lower reaction resistance can be obtained. Thus, the reaction resistance of the lithium ion secondary battery 10 using the positive electrode plate 30 having the coated lithium-containing positive electrode active material particles 22 on the positive electrode layer 32 can be reduced. Alternatively, if the wet mixture 20 is dried, the coated lithium-containing positive electrode active material particles 22 having favorable lithium ion conductivity can be obtained.

Next, production of the positive electrode plate 30 will be described. In a pasting process S5, a conductive material (carbon black), binding agent (PVDF) and like are mixed with the wet mixture 20 containing NMP 14 to form a paste 24. Then, in a coating process (undried positive electrode layer forming process) S6, the paste 24 is applied to the positive electrode current collecting plate 25 to form an undried positive electrode plate 29 having an undried positive electrode layer 27. Here, in the pasting process S5, in order to adjust the viscosity and the like, as necessary, NMP 14 can be additionally added.

Figure 4:
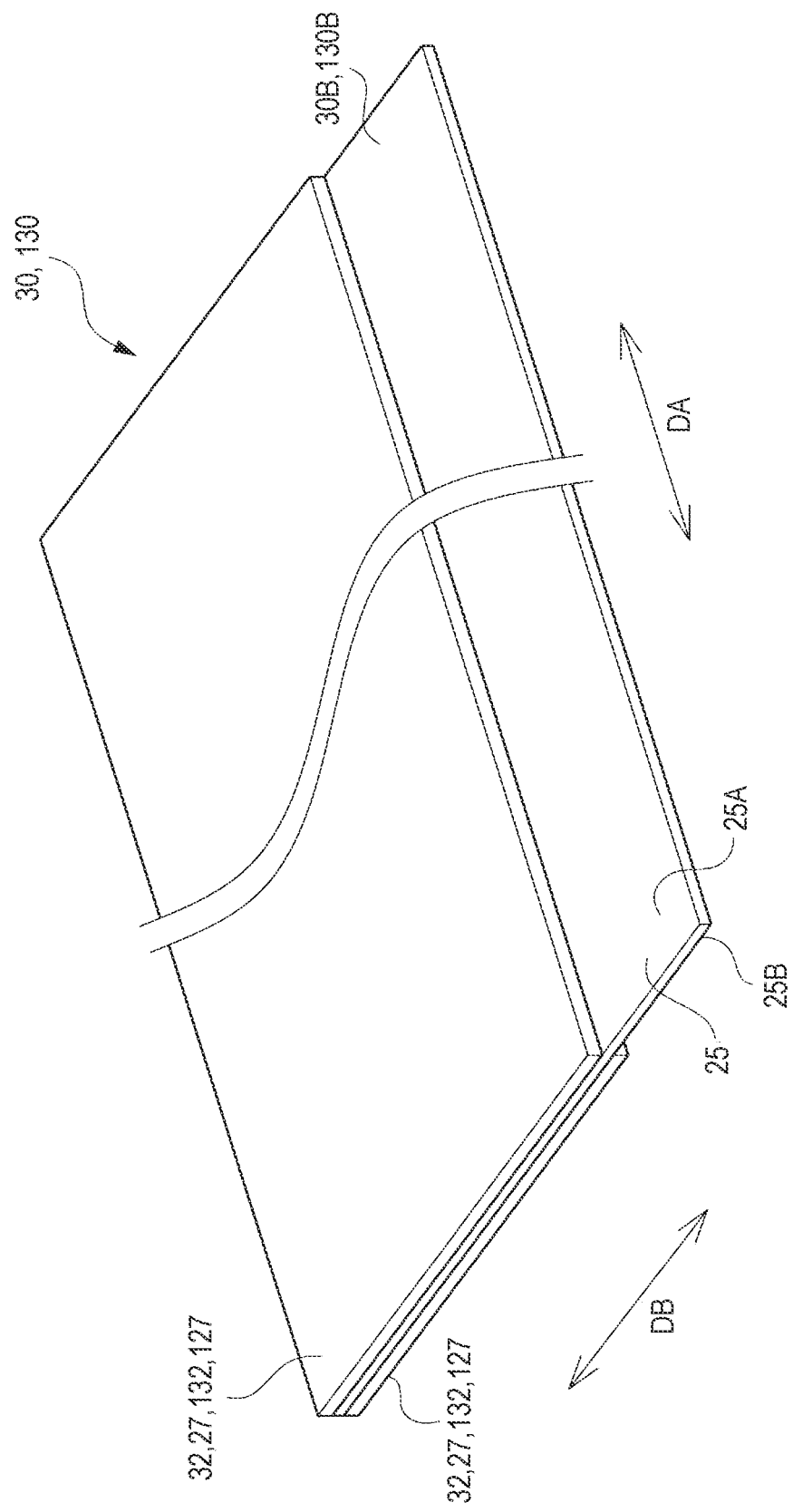
FIG. 4 is a perspective view of a positive electrode plate according to Embodiments 1 and 2.

In addition, in a positive electrode layer drying process S7, the undried positive electrode plate 29 is heated, NMP 14 is vaporized, the undried positive electrode layer 27 is dried, and the positive electrode plate 30 having the positive electrode layer 32 is formed. Here, the coating process S6 and the drying process S7 are repeated, and the positive electrode layer 32 is formed on both surfaces 25A and 25B of the positive electrode current collecting plate 25 (refer to FIG. 4). Here, the positive electrode plate 30 shown in FIG. 4 has a strip shape that is long in a longitudinal direction DA and has one side in a width direction DB (a lower right direction in FIG. 4) on which a positive electrode current collecting part 30B in which the positive electrode current collecting plate 25 is exposed is provided. In addition, when the undried positive electrode plate 29 is heated and dried in the drying process S7, in order to avoid crystallization of the amorphous coating 23 and decrease in lithium ion conductivity, the drying temperature may be set to 500° C. or lower. In addition, the drying temperature may be selected in consideration of a melting point and the like of the binding agent and the like contained in the positive electrode layer 32. For example, a method such as vacuum drying under heating at 100° C. may be used.

In addition, in an electrode body forming process S8, an electrode body 40 is formed using the positive electrode plate 30 together with the negative electrode plate 34 and a separator 36 which are separately prepared according to a known method. In Embodiment 1, the strip-like negative electrode plate 34 and the separator 36 are prepared, and these are wound to form a flat wound electrode body 40 (refer to FIG. 5). At both ends of the electrode body 40, the positive electrode current collecting part 30B and a negative electrode current collecting part 34B are exposed.

In addition, in an assembly process S9, the battery (lithium ion secondary battery) 10 is constructed using a battery case 50, the electrolytic solution 60, and the like which are separately prepared. Specifically, a lid part 52 to which a positive electrode terminal member 71 and a negative electrode terminal member 72 are fixed via an insulating member 75 is prepared, and the positive electrode terminal member 71 is connected to the positive electrode current collecting part 30B of the electrode body 40. In addition, the negative electrode terminal member 72 is connected to the negative electrode current collecting part 34B of the electrode body 40. The electrode body 40 is inserted into a case main body 51, the case main body 51 is blocked with the lid part 52, and the periphery is fixed by laser welding. The electrolytic solution 60 is injected through an injection hole (not shown), and the electrode body 40 is impregnated with the electrolytic solution 60 in the case main body 51. Then, the battery 10 is activated (initially charged) using a positive electrode external terminal part 71A and a negative electrode external terminal part 72A protruding from the lid part 52 and the injection hole is then sealed with a sealing member 77 and the inside of the battery 10 is sealed. Thereby, the battery 10 is completed.

Here, in the above Embodiment 1, without first drying the wet mixture 20 to obtain dried coated lithium-containing positive electrode active material particles 22, in the pasting process S5, the paste 24 in which a conductive material, a binding agent and the like are mixed with the wet mixture 20 is directly formed, and then, in the coating process S6, the paste 24 is applied to the positive electrode current collecting plate 25 to form the undried positive electrode plate 29.

However, as indicated by dotted lines in FIG. 1, in a mixture drying process S4, the wet mixture 20 is dried first to obtain the coated lithium-containing positive electrode active material particles 22. Then, the process returns to the pasting process S5, and a conductive material, a binding agent, and the like and a non-aqueous solvent are mixed together to form the paste 24, and in the coating process S6, the paste is applied to the positive electrode current collecting plate 25, and the undried positive electrode plate 29 having the undried positive electrode layer 27 may be formed.

However, rather than obtaining the coated lithium-containing positive electrode active material particles 22 by first drying the wet mixture 20 in the mixture drying process S4 as indicated by dotted lines, when the wet mixture 20 is not dried and the paste 24 is formed in the pasting process S5 and the undried positive electrode layer 27 containing the wet mixture 20 is formed as indicated by solid lines, it is possible to eliminate a number of processes and costs for drying the wet mixture 20 and production is possible at low cost. Therefore, the positive electrode plate 30 having the positive electrode layer 32 containing the coated lithium-containing positive electrode active material particles 22 having lithium ion conductivity and having a low reaction resistance can be produced at low cost. In addition, since the positive electrode layer 32 containing the coated lithium-containing positive electrode active material particles 22 is provided, the positive electrode plate 30 having a low reaction resistance can be obtained. In addition, in the production method, since the electrode body 40 is formed using the above positive electrode plate 30 having a low reaction resistance, the lithium ion secondary battery 10 having a low resistance can be produced. In addition, since the positive electrode plate 30 having a low reaction resistance is used, the lithium ion secondary battery 10 having a low resistance can be obtained as a battery.

Embodiment 2

In Embodiment 2, in place of the lithium conductor forming solution 16 in Embodiment 1 in which NMP 14 is used as a solvent, in the dissolving and mixing process S1, water 114 is used as a solvent, and a lithium conductor forming solution 116 in which orthophosphoric acid ($H_3PO_4$) is dissolved is obtained. Then, the solution is added dropwise to and mixed with the mixed powder 5 to obtain a wet mixture 120 in the dropwise addition and mixing process S3 in the same manner as in Embodiment 1. In addition, the wet mixture 120 is dried (water 114 is evaporated) in the mixture drying process S4 as indicated by dotted lines, and thereby dried coated lithium-containing positive electrode active material particles 122 are obtained.

In this manner, in the method of producing the coated lithium-containing positive electrode active material particles 122, since the wet mixture 120 is produced by being dried in the mixture drying process S4, the coated lithium-containing positive electrode active material particles 122 can be easily obtained.

Figure 6A:
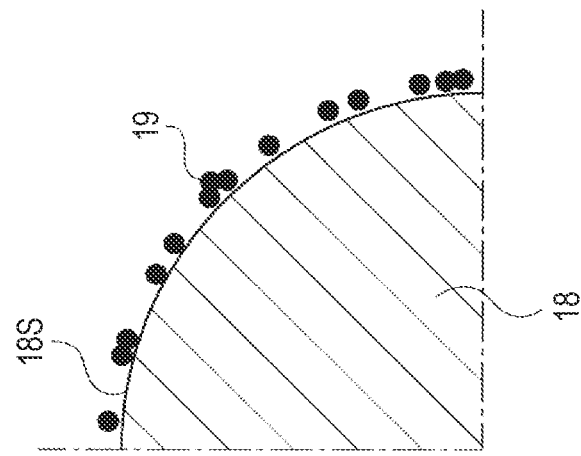
FIG. 6A is the same schematic view as in FIG. 2A.
Figure 6B:
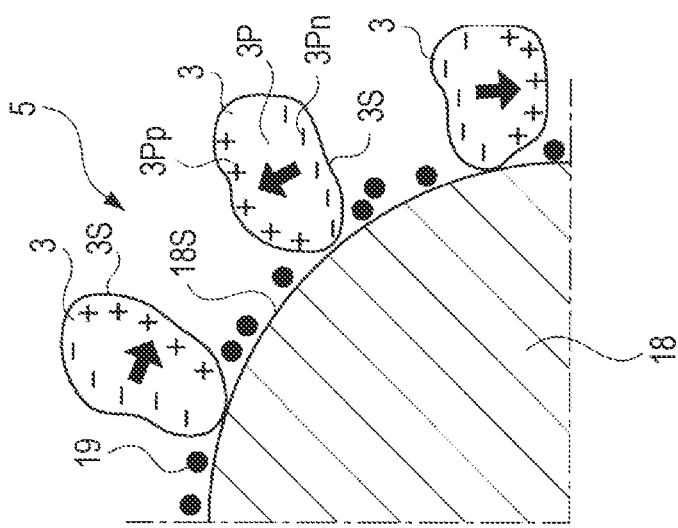
FIG. 6B is the same schematic view as in FIG. 2B.
Figure 6C:
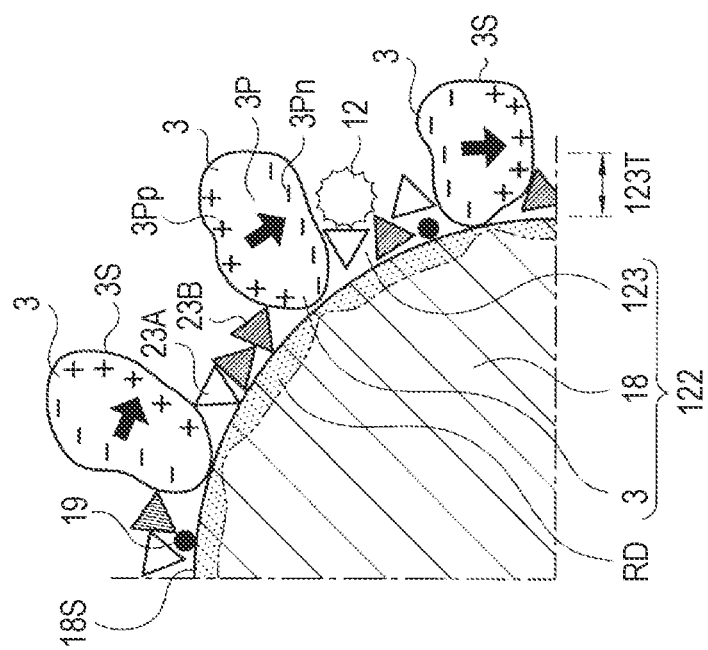
FIG. 6C is a schematic view showing a surface state of coated lithium-containing positive electrode active material particles on which a coating is formed on the surface of lithium-containing positive electrode active material particles having a lithium reduction layer on the surface to which ferroelectric ceramic particles are attached according to Embodiment 2.

In the coated lithium-containing positive electrode active material particles 122 of Embodiment 2, the coating 123 (film thickness 123T) is formed of a lithium conductor in which the barium titanate particles 3 are dispersed, but the lithium reduction layer RD is formed on a part of the surface 18S of the lithium-containing positive electrode active material particles 18 (refer to FIG. 6C). This is because lithium ions in the vicinity of the surface 18S of the lithium-containing positive electrode active material particles 18 elute into water 114 which is a solvent of the lithium conductor forming solution 116. That is, the lithium reduction layer RD is interposed between the coating 123 and the lithium-containing positive electrode active material particles 18. Therefore, in a lithium ion secondary battery 110 using a positive electrode plate 130 having the coated lithium-containing positive electrode active material particles 122 on a positive electrode layer 132, the resistance is higher than that of the battery 10 of Embodiment 1. This is because the lithium reduction layer RD is interposed and thus transfer of lithium ions between the lithium-containing positive electrode active material particles 18 and the electrolytic solution 60 is prevented by the lithium reduction layer RD. Here, the thickness of the lithium reduction layer RD formed on the coated lithium-containing positive electrode active material particles 122 is very thin, for example, about 3 nm to 10 nm, but can be observed through a transmission electron microscope (TEM) or electron energy loss spectroscopy using a transmission electron microscope (TEM-EELS).

Next, production of the positive electrode plate 130 in Embodiment 2 will be described. In the pasting process S5, a conductive material (carbon black), a binding agent, a non-aqueous solvent, and the like are mixed with the dried coated lithium-containing positive electrode active material particles 122 to form a paste 124, and in the coating process (undried positive electrode layer forming process) S6, the paste 124 is applied to the positive electrode current collecting plate 25 to form an undried positive electrode plate 129 having an undried positive electrode layer 127.

In addition, in the positive electrode layer drying process S7, the undried positive electrode plate 129 is heated, water 114 is evaporated, the undried positive electrode layer 127 is dried, and the positive electrode plate 130 having the positive electrode layer 132 is formed. Here, the coating process S6 and the drying process S7 are repeated, and the positive electrode layer 132 is formed on the both surfaces 25A and 25B of the positive electrode current collecting plate 25 (refer to FIG. 4). Here, also in the positive electrode plate 130 shown in FIG. 4, as in Embodiment 1, a positive electrode current collecting part 130B in which the positive electrode current collecting plate 25 is exposed is provided. In addition, when the undried positive electrode plate 129 is heated and dried in the drying process S7, in order to avoid crystallization of the amorphous coating 123 and decrease in lithium ion conductivity, the drying temperature is set to 500° C. or lower. In addition, in consideration of a melting point and the like of a binding agent (PVDF) contained in the positive electrode layer 32, in Example 1, vacuum drying under heating at 100° C. is performed for drying.

Figure 5:
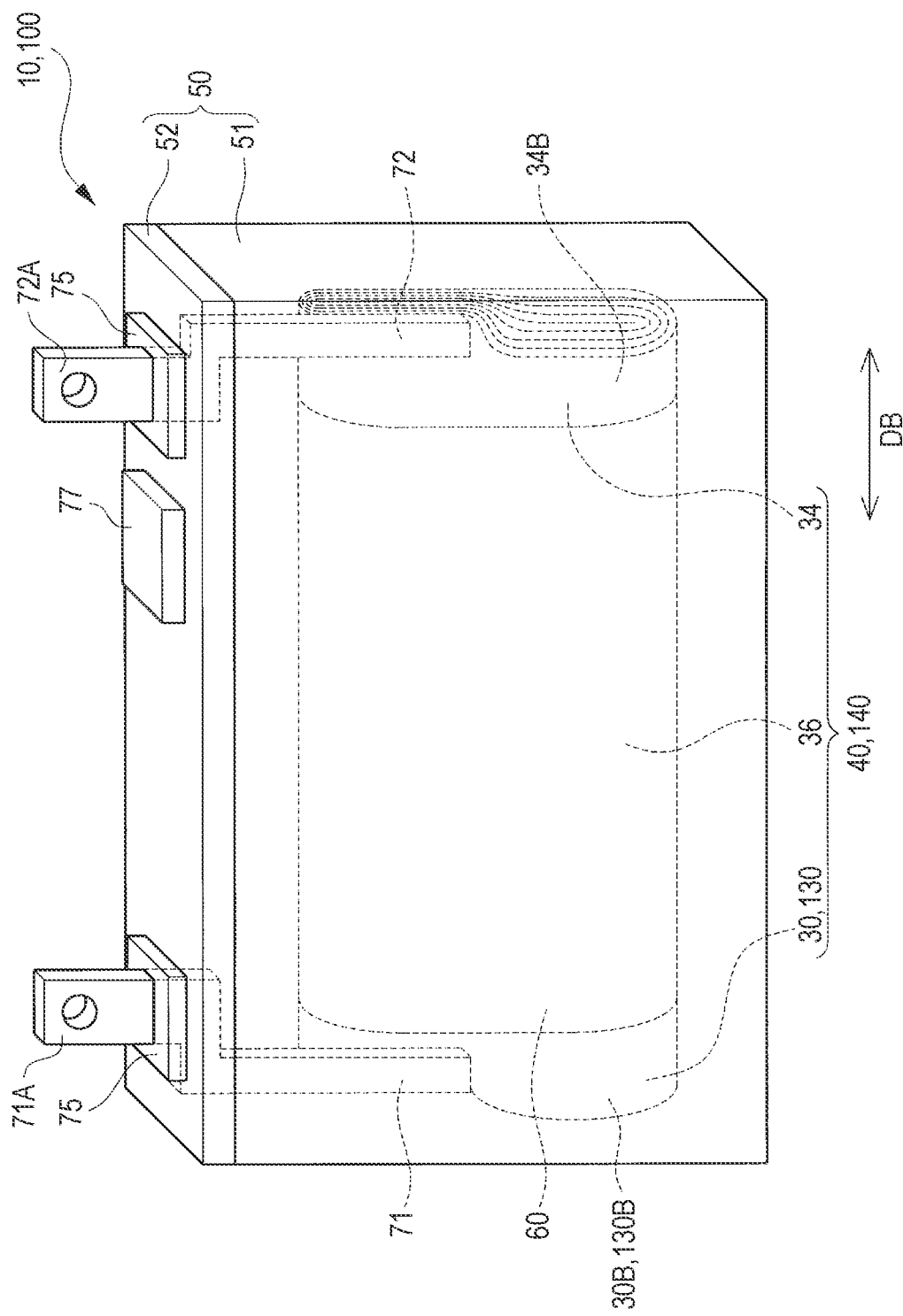
FIG. 5 is a perspective view of a battery according to Embodiments 1 and 2.

In addition, in the electrode body forming process S8, in the same manner as in Embodiment 1, an electrode body 140 is formed using the positive electrode plate 130 together with the negative electrode plate 34 and the separator 36 which are separately prepared (refer to FIG. 5). At both ends of the electrode body 140, the positive electrode current collecting part 130B and the negative electrode current collecting part 34B are exposed. In addition, in the same manner as in Embodiment 1, in the assembly process S9, the battery (lithium ion secondary battery) 110 is constructed using the battery case 50, the electrolytic solution 60, and the like which are separately prepared.

In the method of producing the positive electrode plate 130, the undried positive electrode layer 127 containing the coated lithium-containing positive electrode active material particles 122 obtained in the above mixture drying process S4 is formed on the positive electrode current collecting plate 25, and this is dried to form the positive electrode layer 132. Therefore, the positive electrode plate 130 having the positive electrode layer 132 containing the coated lithium-containing positive electrode active material particles 122 having lithium ion conductivity and having a low reaction resistance can be easily produced.

Production of positive electrode plates of Embodiment 1 and Embodiment 2, and "untreated" positive electrode plate, and preparation of lithium ion secondary batteries (sample battery and control battery) for evaluation test The coated lithium-containing positive electrode active material particles 22 and 122, or the untreated lithium-containing positive electrode active material particles 18, carbon black as a conductive material, and polyvinylidene fluoride as a binder were weighed out at a mass ratio of 90:9:1 and these were dispersed in NMP to prepare positive electrode pastes. These positive electrode pastes were applied to positive electrode current collectors, vacuum-dried and then subjected to a rolling process using a press machine, and thereby positive electrode sheets of "Embodiment 1," "Embodiment 2," and an "untreated" positive electrode sheet were produced.

Next, positive electrode plates produced by punching the positive electrode sheets into a 2 cm$^2$ circular shape and a counter electrode made of metallic lithium were set to face each other with a separator therebetween to construct sample batteries of Embodiments 1 and 2. Regarding an electrolytic solution of these sample batteries, a non-aqueous electrolytic solution in which 1 M LiPF$_6$ was dissolved in a non-aqueous solvent prepared by mixing ethylene carbonate, dimethyl carbonate, and ethyl methyl carbonate at a volume ratio of 3:4:3 was used. Here, a battery using the "untreated" positive electrode sheet was prepared as an "untreated" control battery.

Activation (Initial Charging)

The above sample batteries and control battery were activated (initially charged). Specifically, under a temperature condition of −30° C., constant current (CC) charging was performed at a current of 1C until the battery voltage reached 4.1 V, and constant voltage (CV) charging was then performed until the current value became 1/50C, and a fully charged state was reached. Then, CC discharging was performed at a current of 1 C until the battery voltage reached 3.0 V.

Measurement of Reaction Resistance of Batteries

In the above activated batteries, under a temperature condition of −30° C., CC charging was performed at 1 C, and the state was adjusted to a state of charge (SOC) of 27%.

Then, CC discharging was performed at 10 C for 10 seconds, and an initial battery resistance (IV resistance) was determined from the slope of a primary approximation curve of the current (I)-voltage (V) plot value at this time. Then, the ratio of the IV resistance of the sample batteries according to "Embodiment 1" and "Embodiment 2" when the IV resistance of the "untreated" control battery was set as a reference (100%) was defined as a reaction resistance ratio of each battery. The results are shown in Table 1 and FIG. 3.

TABLE 1

|  | Treatment | Reaction resistance ratio (%) |
|---|---|---|
| Without treatment | No treatment | 100 |
| Embodiment 1 | NMP solution | 70 |
| Embodiment 2 | Aqueous solution | 85 |

Figure 3:
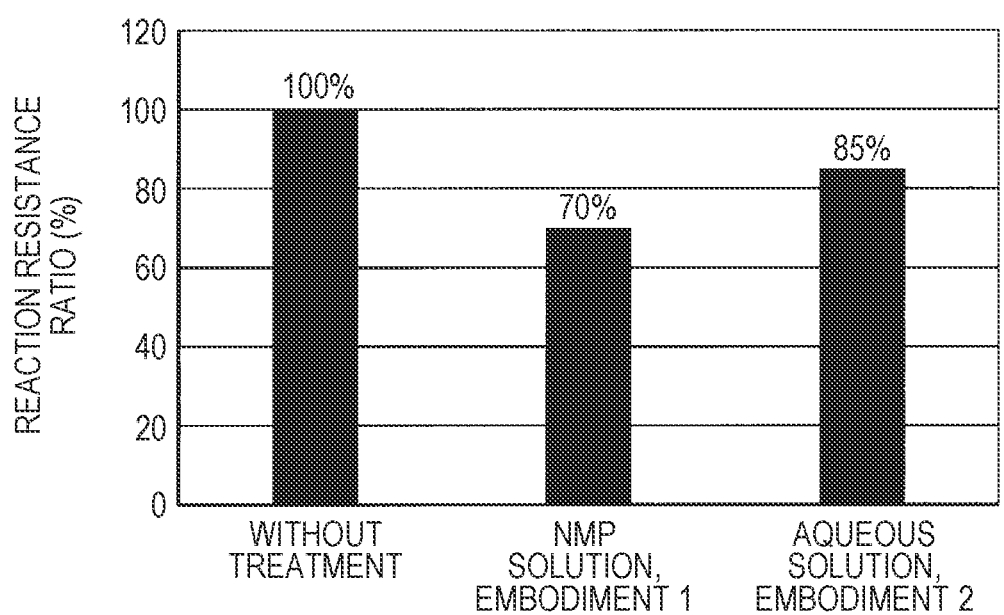

As can be understood from Table 1 and FIG. 3, the reaction resistance of the battery using the coated lithium-containing positive electrode active material particles 122 of "Embodiment 2" was reduced by about 15% compared to the reaction resistance of the battery using the "untreated" lithium-containing positive electrode active material particles 18. In "Embodiment 2," since the lithium-containing positive electrode active material particles 18 were treated with the lithium conductor forming solution 116 using water 114 as a solvent, in the coated lithium-containing positive electrode active material particles 122, the lithium reduction layer RD was formed on a part of the surface 18S of the lithium-containing positive electrode active material particles 18 (refer to FIG. 6C). However, on the other hand, the coating 123 made of a lithium conductor in which the barium titanate particles 3 were dispersed was formed on the surface 18S of the lithium-containing positive electrode active material particles 18. Therefore, it was thought that transfer of lithium ions between the coated lithium-containing positive electrode active material particles 122 and the electrolytic solution 60 was performed more smoothly than transfer of lithium ions between "untreated" lithium-containing positive electrode active material particles 18 (without treatment) having no coating 123 in which the barium titanate particles 3 were dispersed and the electrolytic solution 60.

On the other hand, the reaction resistance of the battery using the coated lithium-containing positive electrode active material particles 22 of "Embodiment 1" was reduced by about 30% compared to the reaction resistance of the battery using the "untreated" lithium-containing positive electrode active material particles 18, and was reduced by about 15% compared to the battery of "Embodiment 2." Unlike the coated lithium-containing positive electrode active material particles 122 of "Embodiment 2" (refer to FIG. 6C), in the coated lithium-containing positive electrode active material particles 22 of "Embodiment 1" (refer to FIG. 2C), there was no lithium reduction layer RD on a part of the surface 18S of the lithium-containing positive electrode active material particles 18, and the coating 23 made of a lithium conductor in which the barium titanate particles 3 were dispersed was directly formed on the surface 18S of the lithium-containing positive electrode active material particles 18. Therefore, it was thought that transfer of lithium ions between the coated lithium-containing positive electrode active material particles 22 and the electrolytic solution 60 was performed more smoothly than transfer of lithium ions between the coated lithium-containing positive electrode active material particles 122 of "Embodiment 2" in which the lithium reduction layer RD was present on a part of the surface 18S and the electrolytic solution 60. In addition, it was thought that transfer of lithium ions was performed more smoothly than transfer of lithium ions between the "untreated" lithium-containing positive electrode active material particles 18 (without treatment) having no coating 123 in which the barium titanate particles 3 were dispersed and the electrolytic solution 60.

While the present disclosure has been described above according to Embodiments 1 and 2, the present disclosure is not limited to Embodiments 1 and 2, but can be appropriately modified and applied without departing from the spirit and scope thereof. While a phosphoric acid concentrate was used in the lithium conductor forming solution 16 in the above Embodiment 1, orthophosphoric acid ($H_3PO_4$), pyrophosphoric acid ($H_4P_2O_7$), and the like can be used. In addition, in Embodiments 1 and 2, regarding a "lithium conductor precursor" used in the lithium conductor forming solutions 16 and 116, a phosphoric acid-based substance such as a phosphoric acid concentrate and orthophosphoric acid ($H_3PO_4$) was used, but tungstic acid ($H_2WO_4$), lithium hydrogen tungstate ($LiHWO_4$), niobic acid ($HNbO_3$), and the like can be used. In this case, $Li_2WO_4$, $LiHWO_4$, or $LiNbO_3$ is formed as a lithium conductor.

In addition, in the above Embodiments 1 and 2, in the dropwise addition and mixing process S3 (solution mixing process), the mixed powder 5 was stirred and the lithium conductor forming solutions 16 and 116 were added dropwise to the mixed powder 5 using a syringe and mixed. However, various methods may be used as a method of mixing the solutions 16 and 116 with the mixed powder 5, such as spraying the lithium conductor forming solutions 16 and 116 toward the mixed powder 5.

In addition, in the above Embodiments 1 and 2, barium titanate particles ($BaTiO_3$) were used as ferroelectric ceramic particles. However, ferroelectric ceramic particles having spontaneous polarization, for example, strontium titanate particles, can be used.

In addition, in the above Embodiments 1 and 2, the pastes 24 and 124 were formed in the pasting process S5, and the pastes 24 and 124 were applied to positive electrode current collecting plate in the coating process S6 to form the undried positive electrode layers 27 and 127. However, a binding agent and the like may be mixed with the wet mixture 20 and granulated once to form a wet granulated body, and an undried positive electrode layer may be formed on the positive electrode current collecting plate 25 according to transfer using a three-roll transfer device.

What is claimed is:

1. A wet mixture, comprising:
   coated lithium-containing positive electrode active material particles including lithium-containing positive electrode active material particles and a coating which is formed on the surface of the lithium-containing positive electrode active material particles and made of an amorphous lithium conductor, and in which crystalline ferroelectric ceramic particles are dispersed; and
   a solvent;
   wherein an average size of the crystalline ferroelectric ceramic particles is larger than a film thickness of the coating.

2. A lithium ion secondary battery, comprising an electrode body using a positive electrode plate containing the coated lithium-containing positive electrode active material particles which are contained in the wet mixture according to claim 1 in a positive electrode layer.

3. The wet mixture of claim 1, wherein the crystalline ferroelectric ceramic particles are $BaTiO_3$ and the average size of the crystalline ferroelectric ceramic particles is lower than a size of 1/10 or less of an average particle size of the lithium-containing positive electrode active material particles.

4. The wet mixture of claim 1, wherein the amorphous lithium conductor includes $Li_3PO_4$, $Li_2HPO_4$, or $LiH_2PO_4$.

5. The wet mixture of claim 1, wherein the film thickness of the coating is 0.5 nm to 1.5 nm.

6. Coated lithium-containing positive electrode active material particles, comprising
   lithium-containing positive electrode active material particles; and
   a coating which is formed on the surface of the lithium-containing positive electrode active material particles and made of an amorphous lithium conductor, and in which crystalline ferroelectric ceramic particles are dispersed;
   wherein an average size of the crystalline ferroelectric ceramic particles is larger than a film thickness of the coating.

7. A lithium ion secondary battery, comprising an electrode body using a positive electrode plate containing the coated lithium-containing positive electrode active material particles according to claim 6 in a positive electrode layer.

* * * * *